United States Patent
Looney

(10) Patent No.: US 10,108,532 B1
(45) Date of Patent: Oct. 23, 2018

(54) SYSTEMS AND METHODS FOR UNIT TESTING OF OPERATING SYSTEM KERNELS FROM USER SPACE

(71) Applicant: Juniper Networks, Inc., Sunnyvale, CA (US)

(72) Inventor: Jonathan T. Looney, Syracuse, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 212 days.

(21) Appl. No.: 15/280,767

(22) Filed: Sep. 29, 2016

(51) Int. Cl.
*G06F 11/36* (2006.01)
*G06F 9/54* (2006.01)
*G06F 11/34* (2006.01)

(52) U.S. Cl.
CPC ............ *G06F 11/3664* (2013.01); *G06F 9/54* (2013.01); *G06F 11/349* (2013.01); *G06F 11/3656* (2013.01)

(58) Field of Classification Search
CPC ............ G06F 11/3664; G06F 11/3684; G06F 11/3688; G06F 11/3672
See application file for complete search history.

(56) References Cited

U.S. PATENT DOCUMENTS

| 9,354,977 B1 | 5/2016 | Backensto et al. | |
|---|---|---|---|
| 2001/0044904 A1 | 11/2001 | Berg et al. | |
| 2006/0095890 A1* | 5/2006 | Reeves | H04Q 3/0054 717/100 |
| 2011/0022840 A1 | 1/2011 | Stefan et al. | |
| 2013/0276056 A1 | 10/2013 | Epstein | |
| 2015/0205948 A1 | 7/2015 | Stefan et al. | |
| 2015/0347108 A1* | 12/2015 | Munshi | G06F 8/41 717/146 |
| 2016/0132365 A1* | 5/2016 | Pan | G06F 9/54 719/317 |
| 2016/0300069 A1* | 10/2016 | Anil | G06F 21/62 |

OTHER PUBLICATIONS

Software framework, https://en.wikipedia.org/wiki/Software_framework, as accessed Jul. 28, 2016, Wikipedia, (Jan. 21, 2005).

(Continued)

*Primary Examiner* — Jigar Patel
(74) *Attorney, Agent, or Firm* — FisherBroyles, LLP

(57) ABSTRACT

The disclosed computer-implemented method may include (1) providing a framework that includes (A) a user-space component and (B) a kernel-space component, (2) identifying, via the user-space component, a series of kernel functions to be tested in kernel space, (3) identifying, via the user-space component, one or more arguments for the series of kernel functions to be tested in kernel space, and then (4) performing, via the user-space component, unit testing of a kernel from user space by (A) generating at least one message that identifies the series of kernel functions and the arguments and (B) sending the message to the kernel-space component to direct the kernel-space component to (I) populate a queue in kernel space with the series of kernel functions and the arguments and (II) sequentially execute the series of kernel functions in the queue with the arguments. Various other methods, systems, and computer-readable media are also disclosed.

18 Claims, 5 Drawing Sheets

(56) References Cited

OTHER PUBLICATIONS

User space, https://en.wikipedia.org/wiki/User_space, as accessed Jul. 28, 2016, Wikipedia, (May 4, 2004).
Object (computer science), https://en.wikipedia.org/wiki/Object_(computer_science), as accessed Jul. 28, 2016, Wikipedia, (Mar. 15, 2004).
Macro (computer science), https://en.wikipedia.org/wiki/Macro_(computer_science), as accessed Jul. 28, 2016, Wikipedia, (Sep. 26, 2007).
Jonathan T. Looney, et al; Systems and Methods for Unit Testing of Functions on Remote Kernels; U.S. Appl. No. 15/040,858, filed Feb. 10, 2016.

* cited by examiner

SYSTEMS AND METHODS FOR UNIT TESTING OF OPERATING SYSTEM KERNELS FROM USER SPACE

BACKGROUND

Unit testing is often performed on software to ensure certain functionality and/or performance. For example, a technology developer may perform unit testing on an application and/or a patch to ensure suitable functionality and/or performance prior to release. Accordingly, unit testing may facilitate detecting bugs within software. However, while traditional unit testing has proven helpful in detecting software bugs in many contexts, such unit testing may still have certain deficiencies that limit its applicability and/or effectiveness in other contexts.

As a specific example, a technology developer may develop a network Operating System (OS) for certain network devices (such as routers and/or switches). In this example, the technology developer may implement certain traditional unit testing tools in user space to test the kernel of the network OS during deployment. Unfortunately, such traditional unit testing tools may be unable to facilitate testing of individual kernel functions with specific parameters. This inability to facilitate such testing may derive at least in part from the kernel functions' definitions, which call for and/or expect parameters to be passed by reference. In other words, the kernel functions may call for and/or expect parameters residing in kernel space to be passed as arguments by their respective addresses, which are not visible and/or known to the traditional unit testing tools in user space.

In another traditional approach, the technology developer may be able to write test scripts that facilitate testing of individual kernel functions and/or their parameters within the kernel itself. Unfortunately, to carry out this type of testing, the technology developer may need to link these scripts with the kernel, thereby potentially bloating the kernel, changing the kernel's behavior, causing the kernel to perform poorly or inefficiently, or even halting the kernel.

The instant disclosure, therefore, identifies and addresses a need for systems and methods for unit testing of operating system kernels from user space.

SUMMARY

As will be described in greater detail below, the instant disclosure generally relates to systems and methods for unit testing of operating system kernels from user space. In one example, a computer-implemented method for unit testing of operating system kernels from user space may include (1) providing a framework that includes (A) a user-space component that runs in user space on a computing device and (B) a kernel-space component that runs in kernel space on the computing device, (2) identifying, via the user-space component, a series of kernel functions to be tested in kernel space on the computing device, (3) identifying, via the user-space component, one or more arguments for the series of kernel functions to be tested in kernel space on the computing device, and then (4) performing, via the user-space component, unit testing of a kernel of the computing device from user space by (A) generating at least one message that identifies the series of kernel functions to be tested in kernel space and the arguments for the series of kernel functions and (B) sending the message to the kernel-space component to direct the kernel-space component to (I) populate a queue in kernel space with the series of kernel functions and the arguments identified in the message and then (II) sequentially execute, in kernel space, the series of kernel functions in the queue with the arguments.

As another example, a system for implementing the above-described method may include a framework, stored in memory, that includes a user-space component that runs in user space on a computing device and a kernel-space component that runs in kernel space on the computing device. In this example, the system may also include at least one physical processor that executes the framework. The user-space component may (1) identify a series of kernel functions to be tested in kernel space on the computing device, (2) identify, via the user-space component, one or more arguments for the series of kernel functions to be tested in kernel space on the computing device, (3) perform, via the user-space component, unit testing of a kernel of the computing device from user space by (A) generating at least one message that identifies the series of kernel functions to be tested in kernel space and the arguments for the series of kernel functions and (B) sending the message to the kernel-space component to direct the kernel-space component to (I) populate a queue in kernel space with the series of kernel functions and the arguments identified in the message and then (II) sequentially execute, in kernel space, the series of kernel functions in the queue with the arguments.

As a further example, the above-described method may be encoded as computer-readable instructions on a non-transitory computer-readable medium. For example, a computer-readable medium may include one or more computer-executable instructions that, when executed by at least one processor of a computing device, cause the computing device to (1) provide a framework that includes (A) a user-space component that runs in user space on a computing device and (B) a kernel-space component that runs in kernel space on the computing device, (2) identify, via the user-space component, a series of kernel functions to be tested in kernel space on the computing device, (3) identify, via the user-space component, one or more arguments for the series of kernel functions to be tested in kernel space on the computing device, and then (4) perform, via the user-space component, unit testing of a kernel of the computing device from user space by (A) generating at least one message that identifies the series of kernel functions to be tested in kernel space and the arguments for the series of kernel functions and (B) sending the message to the kernel-space component to direct the kernel-space component to (I) populate a queue in kernel space with the series of kernel functions and the arguments identified in the message and then (II) sequentially execute, in kernel space, the series of kernel functions in the queue with the arguments.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
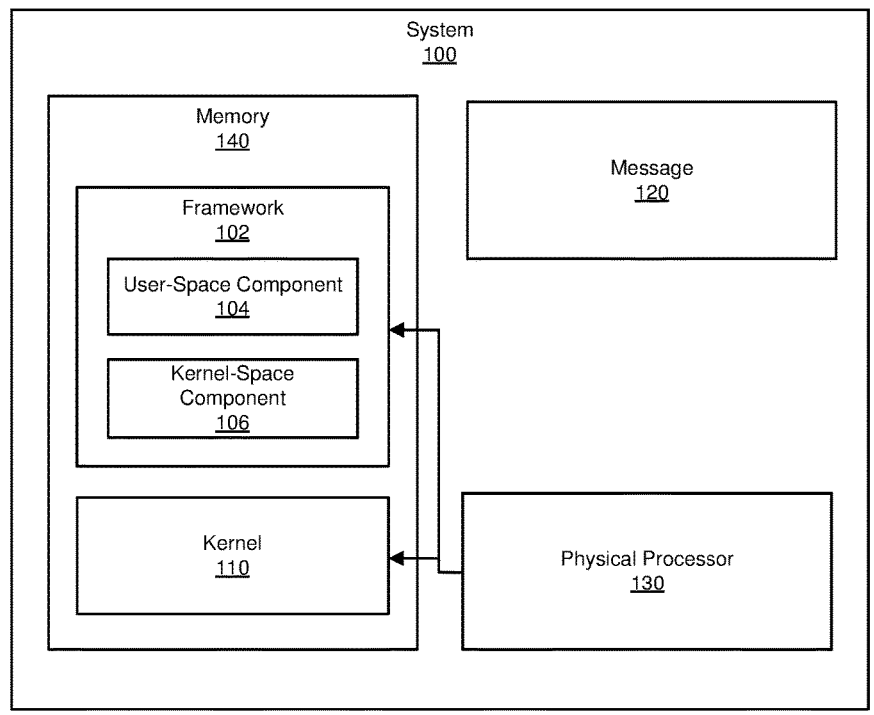
FIG. 1 is a block diagram of an exemplary system for unit testing of operating system kernels from user space.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for unit testing of operating system kernels from user space. As will be explained in greater detail below, embodiments of the instant disclosure may provide a unit-testing framework that includes a user-space component that runs in user space and a kernel-space component that runs in kernel space. By providing this unit testing framework, embodiments of the instant disclosure may enable the user-space component in user space to perform unit testing of individual kernel functions with specific arguments in kernel space.

Moreover, these embodiments may enable the user-space component to modify and/or override an object and/or data that resides in kernel space. For example, these embodiments may enable the user-space component to populate a queue in kernel space with the series of kernel functions and the specific arguments and then sequentially execute, in kernel space, the series of kernel functions with the arguments in the queue with a single command and/or as a single executable block. By sequentially executing the series of kernel functions with the arguments in the queue in this way, these embodiments may facilitate kernel debugging from user space and/or provide an interactive user-space kernel debugger. This debugger may run in the user space but have control over and/or debugging capabilities in kernel space.

The term "unit testing," as used herein, generally refers to any type or form of software testing methodology and/or technique in which a specified unit and/or module of source code and/or machine code is tested for viability, reliability, and/or performance. The term "kernel," as used herein, generally refers to any type or form of OS kernel. In one example, the kernel may manage and/or mediate access to computing and/or network resources in connection with a network OS.

Figure 2:
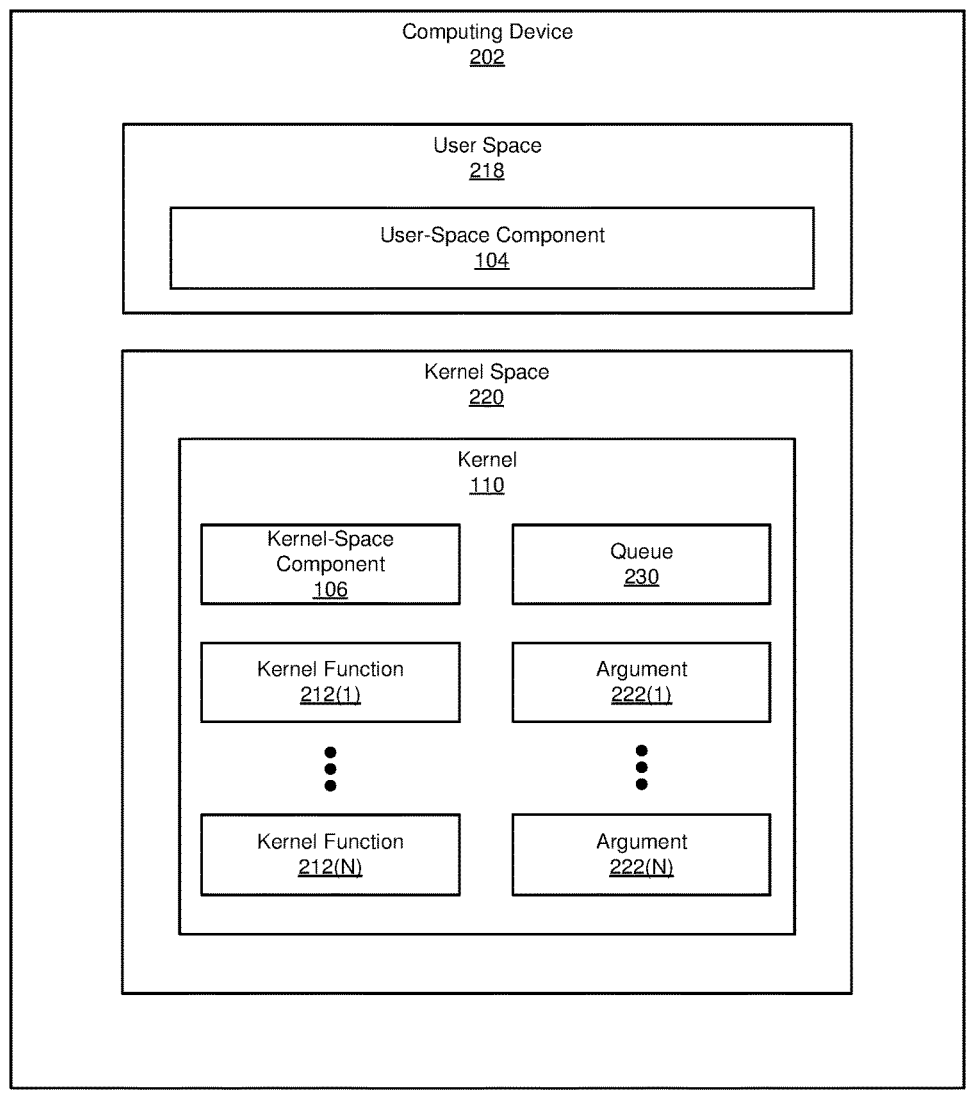
FIG. 2 is a block diagram of an additional exemplary system for unit testing of operating system kernels from user space.

The following will provide, with reference to FIGS. 1 and 2, detailed descriptions of exemplary systems for unit testing of operating system kernels from user space. Detailed descriptions of corresponding computer-implemented methods will be provided in connection with FIG. 3. Detailed descriptions of an exemplary queue of kernel functions will be provided in connection with FIG. 4. In addition, detailed descriptions of an exemplary computing system will be provided in connection with FIG. 5.

FIG. 1 is a block diagram of an exemplary system 100 for unit testing of operating system kernels from user space. As illustrated in this figure, exemplary system 100 may include a framework 102 that facilitates unit testing of operating system kernels from user space. The term "framework," as used herein, generally refers to any type or form of development and/or testing structure, environment, tool, and/or platform that facilitates unit testing of functions on kernels. In one example, framework 102 may include and/or represent any set of Application Programming Interfaces (APIs), Application Binary Interfaces (ABIs), support programs, compilers, software or code libraries, tools, and/or components. Additionally or alternatively, framework 102 may include and/or represent certain components distributed across multiple physical and/or logical devices. Although illustrated as a single entity in FIG. 1, framework 102 may alternatively include and/or represent multiple frameworks available to and/or incorporated in system 100.

As illustrated in FIG. 1, framework 102 may include and/or represent a user-space component 104 that runs and/or operates in user space and a kernel-space component 106 that runs and/or operates in kernel space. The term "component," as used herein in connection with a framework, generally refers to any type or form of software application, program, and/or module stored on and/or configured to run on a computing device. In one example, user-space component 104 may, when executed by a computing device, cause the computing device to perform certain tasks directed to unit testing of functions on kernels. For example, user-space component 104 may generate, in user space, a message that identifies kernel functions, parameters to pass to the kernel functions as arguments, and/or attributes of one or more of the same. User-space component 104 may then send this message to kernel-space component 106 for consumption in kernel space.

In another example, kernel-space component 106 may, when executed by a computing device, cause the computing device to perform certain tasks directed to unit testing of functions in kernel space. For example, kernel-space component 106 may identify and/or obtain references to objects that reside in kernel space by way of those objects' attributes. In this example, kernel-space component 106 may direct the computing device to invoke and/or execute certain kernel functions in connection with those objects by way of their references.

The term "user space," as used herein, generally refers to any type or form of memory and/or address space that has been designated for and/or allocated to application software and/or components. The term "kernel space," as used herein, generally refers to any type or form of memory and/or address space that has been designated for and/or allocated to an OS kernel and/or OS components. In some examples, user space and kernel space may include and/or represent mutually exclusive virtual memory allocations and/or execution contexts that are separate and/or segregated from one another.

As an example, user space may include and/or represent a specific address space and/or memory allocation on a computing device, and kernel space may include and/or represent a different address space and/or memory allocation on the computing device. In this example, user space and kernel space may be located on and/or represented as different address spaces and/or memory allocations on a single physical device. Accordingly, user space and kernel space may represent different virtual memory spaces.

In some examples, framework 102 may include and/or represent one or more APIs that facilitate copying data between user space and kernel space, selecting a macro that maps to one or more kernel functions, storing an output value that results from sequentially executing a series of kernel functions in a queue, returning the output value that results from sequentially executing the series of kernel functions to user space, modifying data stored in kernel space from user space, caching the series of kernel functions in the queue for execution in kernel space, debugging an operating system kernel from user space, variations or combinations of one or more of the same, and/or any other suitable features.

Although not necessarily illustrated in this way in FIG. 1, framework 102 may also include macros that map to function calls in kernel space. The term "macro," as used herein, generally refers to any rule or pattern that defines how an input sequence or string maps to an output sequence or string. For example, a macro may map a single program statement to multiple kernel functions. As a result, when the macro is called in kernel space via the single program statement, the kernel may identify and execute the corresponding kernel functions.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain portions of framework 102. Examples of memory 140 include, without limitation, Random Access Memory (RAM), Read Only Memory (ROM), flash memory, Hard Disc Drives (HDDs), Solid-State Drives (SSD), optical disk drives, caches, variations or combinations of one or more of the same, and/or any other suitable memory.

As illustrated in FIG. 1, exemplary system 100 may also include one or more physical processors, such as physical processor 130. Physical processor 130 generally represents any type or form of hardware implemented processing unit capable of interpreting and/or executing computer-readable instructions. In one example, physical processor 130 may access and/or modify portions of framework 102 stored in memory 140. Additionally or alternatively, physical processor 130 may execute portions of framework 102 to perform unit testing of operating system kernels from user space. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include a kernel 110. In one example, kernel 110 may include and/or represent a network OS kernel on a network device. In this example, kernel 110 may manage and/or mediate access to computing and/or network resources in connection with the network OS. Although not necessarily illustrated in this way in FIG. 1, kernel-space component 106 may reside in and/or represent part of kernel 110.

As illustrated in FIG. 1, exemplary system 100 may also include one or more messages, such as message 120. In one example, message 120 may include and/or represent a communication that is generated by user-space component 104 in user space. In this example, message 120 may identify a series of kernel functions to be tested in kernel space and/or specific arguments for such kernel functions. Message 120 may be sent from user space to kernel space to enable kernel-space component 106 to populate a queue in kernel space with the series of kernel functions and the specific arguments and then sequentially execute, in kernel space, the series of kernel functions with the specific arguments in the queue. Although described herein as a singular entity, message 120 may alternatively include and/or represent a plurality of messages.

Exemplary system 100 in FIG. 1 may be implemented in a variety of ways. For example, all or a portion of exemplary system 100 may represent portions of exemplary computing device 202 in FIG. 2. As shown in FIG. 2, computing device 202 may be programmed with user-space component 104 of framework 102 in user space 218. In this example, computing device 202 may also be programmed with kernel 110 that includes kernel-space component 106 of framework 102 in kernel space 220. Kernel 110 may also include kernel functions 212(1)-(N) and/or arguments 222(1)-(N). Kernel 110 may further include a queue 230 that stores a series of kernel functions 212(1)-(N) with arguments 222(1)-(N) for execution as a single block.

In one embodiment, one or more portions of framework 102 from FIG. 1 may, when executed by at least one processor of computing device 202, enable computing device 202 to facilitate unit testing of an operating system kernel from user space. For example, and as will be described in greater detail below, framework 102 may cause computing device 202 to (1) provide framework 102 that includes (A) user-space component 104 that runs in user space 218 on computing device 202 and (B) kernel-space component 106 that runs in kernel space 220 on computing device 202, (2) identify, via user-space component 104, a series of kernel functions 212(1)-(N) to be tested in kernel space 220 on computing device 202, (3) identify, via user-space component 104, one or more of arguments 222(1)-(N) for the series of kernel functions 212(1)-(N) to be tested in kernel space 220 on computing device 202, and then (4) perform, via user-space component 104, unit testing of kernel 110 from user space 218 by (A) generating message 120 that identifies the series of kernel functions 212(1)-(N) to be tested in kernel space 220 and the corresponding arguments 222(1)-(N) and (B) sending message 120 to kernel-space component 106 to direct kernel-space component 106 to (I) populate queue 230 in kernel space 220 with the series of kernel functions 212(1)-(N) and the corresponding arguments 222(1)-(N) identified in message 120 and then (II) sequentially execute, in kernel space 220, the series of kernel functions 212(1)-(N) in queue 230 with the corresponding arguments 222(1)-(N).

Computing device 202 generally represents any type or form of computing device capable of reading computer-executable instructions. Examples of computing device 202 include, without limitation, routers, switches, modems, gateways, hubs, repeaters, servers, laptops, desktops, tablets, mobile devices, cellular phones, Personal Digital Assistants (PDAs), multimedia players, embedded systems, wearable devices (e.g., smart watches, smart glasses, etc.), gaming consoles, internet-enabled televisions, BLU-RAY players, clusters, portions of one or more of the same, variations or combinations of one or more of the same, and/or any other suitable computing device.

Although not necessarily illustrated in this way in FIG. 2, alternative embodiments may involve multiple computing devices that are connected to one another by way of a network. For example, a network may include a computing device that is capable of communicating with a network device (such as a router and/or switch). In this example, the computing device may include and/or be programmed with user-space component 104. In this example, the network device may include and/or be programmed with kernel-space component 106. User-space component 104 on the computing device may direct kernel-space component 106 to populate a queue in kernel space with a series of kernel functions and then sequentially execute, in kernel space, the series of kernel functions in the queue as a single block.

Figure 3:
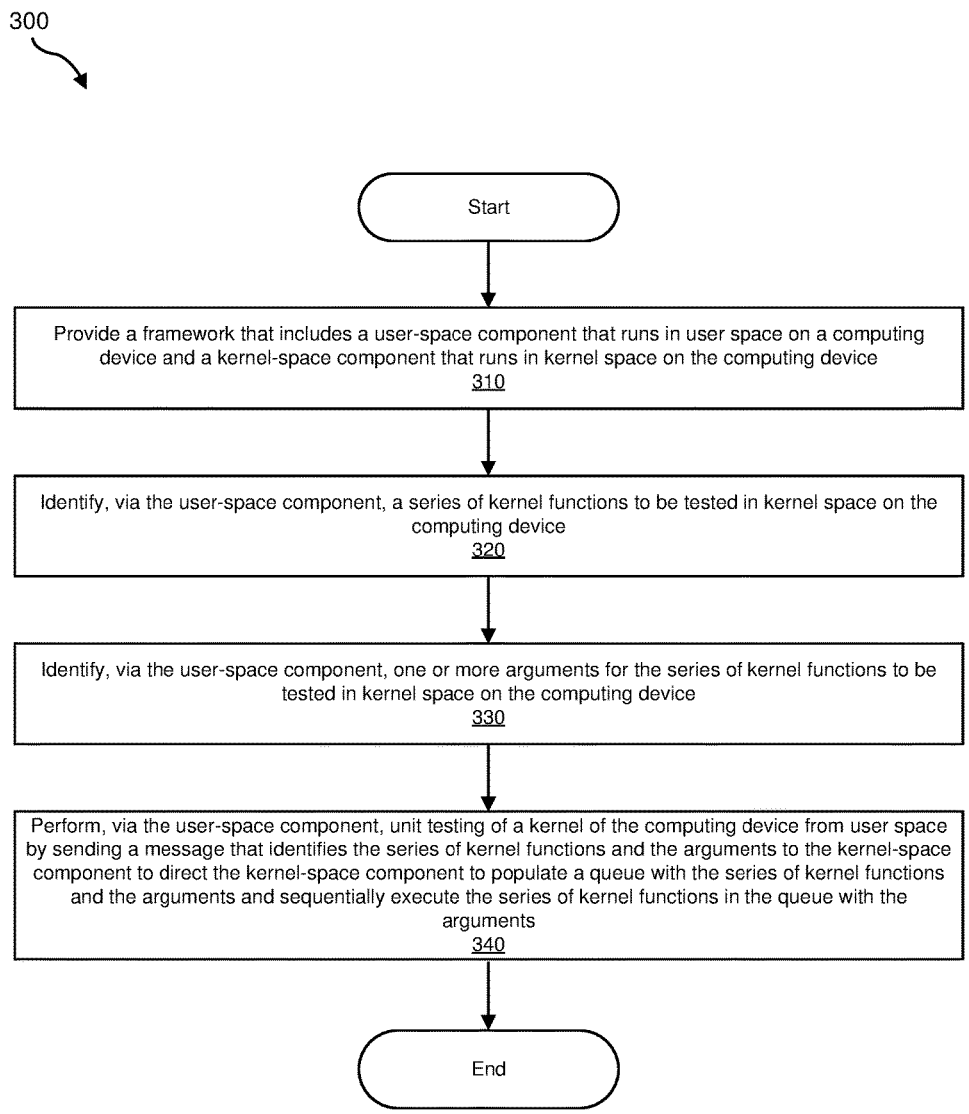
FIG. 3 is a flow diagram of an exemplary method for unit testing of operating system kernels from user space.

FIG. 3 is a flow diagram of an exemplary computer-implemented method 300 for unit testing of operating system kernels from user space. The steps shown in FIG. 3 may be performed by any suitable computer-executable code and/or computing system. In some embodiments, the steps shown in FIG. 3 may be performed by one or more of the components of system 100 in FIG. 1, computing device 202 in FIG. 2, and/or computing system 500 in FIG. 5.

As illustrated in FIG. 3, at step 310 one or more of the systems described herein may provide a framework that includes a user-space component that runs in user space on a computing device and a kernel-space component that runs in kernel space on the computing device. For example, framework 102 may, as part of computing device 202 in FIG. 2, include and/or provide user-space component 104 that runs in user space 218 on computing device 202. In this example, framework 102 may, as part of computing device 202 in FIG. 2, include and/or provide kernel-space component 106 that runs in kernel space 220 on computing device 202.

The systems described herein may perform step 310 in a variety of ways. In some examples, framework 102 may provide user-space component 104 in user space 218 and/or kernel-space component 106 in kernel space 220 upon installation and/or configuration of framework 102 on computing device 202. For example, computing device 202 may download and/or install user-space component 104 in user space 218. In this example, computing device 202 may download and/or install kernel-space component 106 in kernel space 220.

In some examples, framework 102 may be installed on computing device 202 at the time of manufacturing. Accordingly, framework 102 may include and/or represent preinstalled software. Additionally or alternatively, framework 102 may be installed on computing device 202 at a later point in time by a developer and/or administrator.

Returning to FIG. 3, at step 320 one or more of the systems described herein may identify, via the user-space component, a series of kernel functions to be tested in kernel space on the computing device. For example, user-space component 104 may, as part of computing device 202 in FIG. 2, identify a series of kernel functions 212(1)-(N) to be tested in kernel space 220 on computing device 202. In one example, the addresses of kernel functions 212(1)-(N) may not be exposed, visible, and/or known to user-space component 104 in user space 218 on computing device 202.

The systems described herein may perform step 320 in a variety of ways. In some examples, user-space component 104 may identify the series of kernel functions 212(1)-(N) indirectly based at least in part on certain attributes of those kernel functions. For example, user-space component 104 may specify a certain kernel function based on the function's name. As a specific example, user-space component 104 may specify "in_pcblookup_group," "intotcpcb," "malloc," "memcpy," and/or "tcpdrop" as names of kernel functions to be queued and/or pipelined for execution in kernel space 220. In this example, these names may correspond to, identify, and/or represent the "in_pcblookup_group( )" "intotcpcb( )" "malloc( )" "memcpy( )" and/or "tcpdrop( )" kernel functions in kernel space 220.

In some examples, the attributes may uniquely describe the selected kernel functions in connection with a lookup function in kernel space 220. In one example, the function names may each effectively serve as a key for looking up the address of the selected kernel function via a specific lookup function. For example, kernel-space component 106 may use these function names as input in a lookup function such as "linker_file_foreach( )" and/or "linker_file_lookup_symbol( )". In this example, the lookup function may return the address of the selected kernel function.

In some examples, user-space component 104 may identify the series of kernel functions 212(1)-(N) based at least in part on user input. For example, a user operating computing device 202 may direct user-space component 104 to identify and/or select the series of kernel functions 212(1)-(N) by way of commands, instructions, and/or code. Additionally or alternatively, user-space component 104 may identify and/or select the series of kernel functions 212(1)-(N) on its own based at least in part on programmed scheduling, random selection, and/or artificial intelligence.

Returning to FIG. 3, at step 330 one or more of the systems described herein may identify, via the user-space component, one or more arguments for the series of kernel functions to be tested in kernel space on the computing device. For example, user-space component 104 may, as part of computing device 202 in FIG. 2, identify one or more of arguments 222(1)-(N) for the series of kernel functions 212(1)-(N) to be tested in kernel space 220 on computing device 202. In one example, some of arguments 222(1)-(N) may be explicitly available and/or identifiable in user space 218. In this example, user-space component 104 may identify and/or select actual values for these arguments.

Additionally or alternatively, some of arguments 222(1)-(N) may be unexposed, invisible, and/or unknown to user-space component 104 in user space 218 on computing device 202. In this example, user-space component 104 may be unable to identify and/or select actual values for these arguments solely by consulting information contained in user space 218.

In certain examples, arguments 222(1)-(N) may each include and/or represent a value and/or representation. For example, argument 222(1) may include and/or represent a number, character, and/or string. Additionally or alternatively, argument 222(N) may include and/or represent a physical and/or logical interface and/or computer component. Additional examples of arguments 222(1)-(N) include, without limitation, kernel functions, nexthops, IPv4 routes, IPv6 routes, route tables, memory buffers, protocol families, memory offsets, host cache entries, kernel global variables, kernel object addresses, variations or combinations of one or more of the same, and/or any other suitable arguments or parameters.

The systems described herein may perform step 330 in a variety of ways. In some examples, user-space component 104 may identify some of arguments 222(1)-(N) by selecting specific values to be passed to certain kernel functions for execution in kernel space 220. For example, user-space component 104 may select a value of "100" to be passed to kernel function 212(1) in kernel space 220.

Additionally or alternatively, user-space component 104 may identify some of arguments 222(1)-(N) based at least in part on certain memory locations in user space 218. For example, user-space component 104 may identify a memory location that currently stores a value of "200" in user space 218. In this example, user-space component 104 may select the value of "200" by collecting and/or copying the "200" value stored in that particular memory location. User-space component 104 may also identify some of arguments 222(1)-(N) based on memory locations in kernel space 220.

In some examples, user-space component 104 may identify some of arguments 222(1)-(N) indirectly based at least in part on certain attributes of those arguments. For example, user-space component 104 may specify an Internet Protocol version 4 (IPv4) route and/or Internet Protocol version 6 (IPv6) route based at least in part on a route prefix. Additionally or alternatively, user-space component 104 may specify a physical or logical interface on computing device 202 based at least in part on an interface index.

Returning to FIG. 3, at step 340 one or more of the systems described herein may perform, via the user-space component, unit testing of a kernel of the computing device from user space. For example, user-space component 104 may, as part of computing device 202 in FIG. 2, perform unit testing of kernel 110 and/or kernel functions 212(1)-(N) from user space 218 via user-space component 104. By unit testing kernel 110 and/or kernel functions 212(1)-(N) from user space 218 in this way, user-space component 104 may, in conjunction with kernel-space component 106, overcome and/or mitigate some of the deficiencies found in traditional approaches to kernel debugging. In particular, these components may facilitate interactive kernel debugging from user space 218 such that user-space component 104 is able to select specific kernel functions with specific arguments in user space 218 to be executed and/or tested in kernel space 220. As a result, these components may facilitate unit testing of specific kernel functions and arguments in kernel space 220 without necessarily bloating the kernel, halting the kernel, changing the kernel's behavior, and/or causing the kernel to perform poorly or inefficiently during debugging.

The systems described herein may perform step 340 in a variety of ways. In some examples, user-space component 104 may perform unit testing of kernel 110 from user space 218 by sending message 120 that identifies the series of kernel functions 212(1)-(N) and corresponding arguments 222(1)-(N) to kernel-space component 106. For example, user-space component 104 may generate message 120 that identifies the series of kernel functions 212(1)-(N) and corresponding arguments 222(1)-(N) to be tested in kernel space 220. Upon generating message 120 in this way, user-space component 104 may send message 120 to kernel-space component 106 within computing device 202.

In response to receiving message 120, kernel-space component 106 may populate queue 230 in kernel space 220 with the series of kernel functions 212(1)-(N) and corresponding arguments 222(1)-(N). For example, kernel-space component 106 may enter the function names identified in message 120 as input into a lookup function that returns references (such as addresses) to the corresponding kernel functions in kernel space 220. Additionally or alternatively, kernel-space component 106 may enter attributes of arguments 222(1)-(N) identified in message 120 as input into one or more lookup functions that return the specific values that serve as arguments 222(1)-(N) and/or references (such as addresses) to such values in kernel space 220.

Upon resolving the selected kernel functions and corresponding arguments from message 120, kernel-space component 106 may fetch these selected functions and arguments from their memory locations in kernel space 220 and then populate queue 230 with the same such that they are executed as a single block. Additionally or alternatively, kernel-space component 106 may invoke the selected functions and arguments by way of references returned by the lookup functions.

Figure 4:
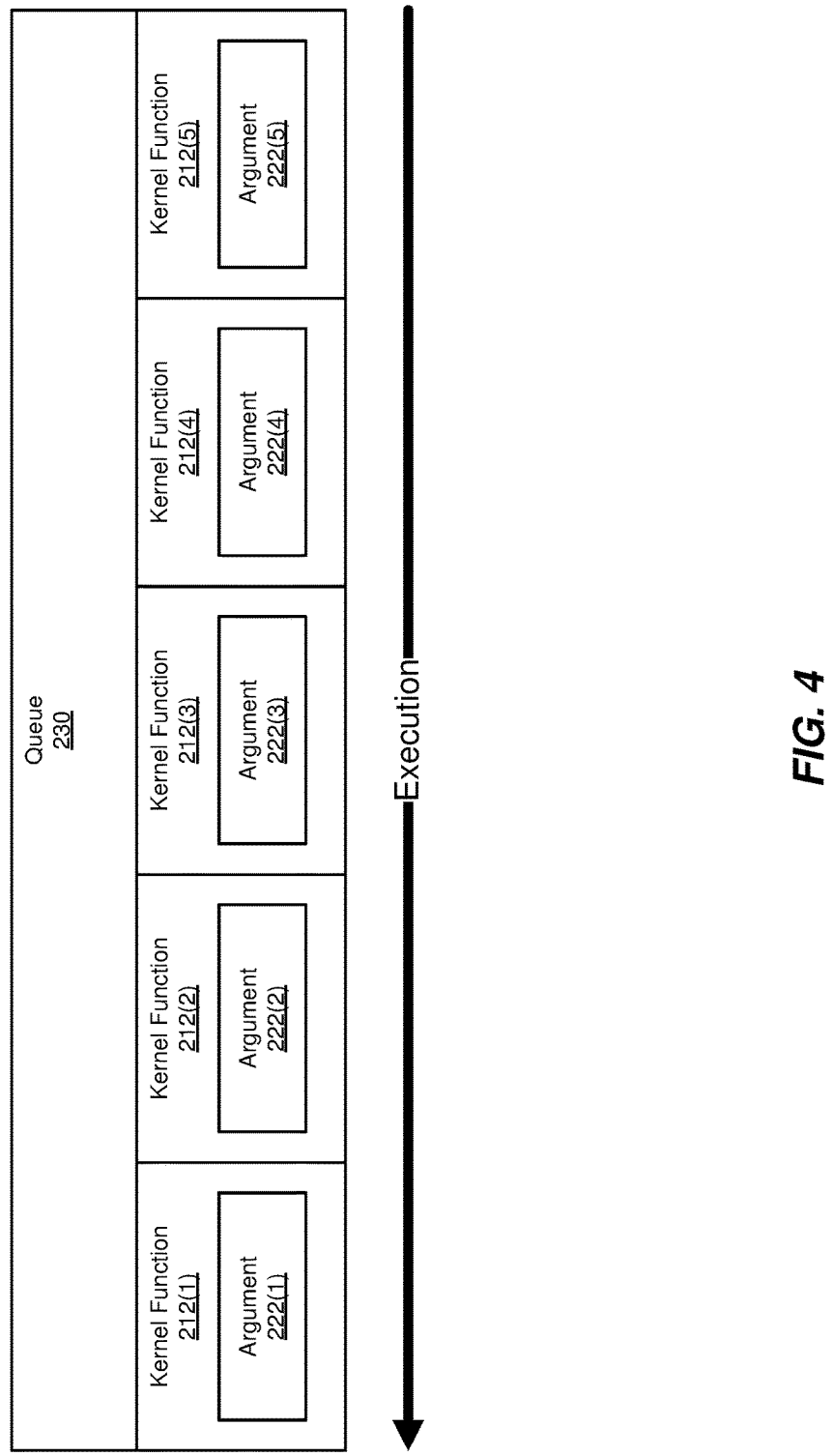
FIG. 4 is an illustration of an exemplary queue of kernel functions set for execution in kernel space as directed by a user-space component in user space.

As a specific example, kernel-space component 106 may populate queue 230 in FIG. 4 with kernel functions 212(1), 212(2), 212(3), 212(4), and 212(5). As illustrated in FIG. 4, kernel function 212(1) may have argument 222(1), kernel function 212(2) may have argument 222(2), kernel function 212(3) may have argument 222(3), kernel function 212(4) may have argument 222(4), and kernel function 212(5) may have argument 222(5). In this example, queue 230 may be structured and/or formatted such that kernel 110 executes all of kernel functions 212(1)-(5) as a single block. This execution may start with kernel function 212(1) and end with kernel function 212(5). In other words, in response to a single command from user-space component 104, kernel-space component 106 may cause kernel 110 to sequentially execute the series of kernel functions 212(1)-(5) one after the other.

In one example, kernel-space component 106 may perform this execution in a pre-existing thread in kernel space 220. Additionally or alternatively, kernel-space component 106 may perform this execution in a new thread in kernel space 220. For example, kernel-space component 106 may launch a new thread in kernel space 220 and then sequentially execute the entire series of kernel functions 212(1)-(5) as a single block by way of the new thread. In this example, kernel-space component 106 may launch this new thread and perform the execution in this new thread without halting kernel 110. In other words, kernel-space component 106 may facilitate the execution of kernel functions 212(1)-(5) without disturbing any operations scheduled for execution in a pre-existing thread of kernel 110.

In some examples, queue 230 may serve as and/or constitute a pipeline in which each kernel function may or may not use objects that were created, retrieved, and/or modified by a previous function. As a result, a queued kernel function may effectively lock a data structure that stores at least one value in connection with the execution of the remaining queued kernel functions. For example, execution of this queued kernel function may place a read lock on the data structure to secure that data structure during a read operation. After the data structure is locked, another queued kernel function may retrieve data from the locked data structure. A further queued kernel function may then unlock the data structure.

In another example, execution of this queued kernel function may place a write lock on the data structure to secure that data structure during a write operation. After the data structure is locked, another queued kernel function may retrieve data from the locked data structure and then modify that data. After modification of that data, a further queued kernel function may store the modified data back in the locked data structure. An additional queued kernel function may then unlock the data structure. Both the lock and unlock functions may be queued in the same queue. This functionality may enable a user of the debugging framework to (1) limit the time that he or she holds the lock, (2) decrease the likelihood that the system will encounter a deadlock situation, and/or (3) reduce the likelihood that user-space component 104 will accidentally exit without releasing the lock.

In some examples, kernel-space component 106 may obtain at least one output value that results from executing one of kernel functions 212(1)-(5) in queue 230. For example, kernel-space component 106 may obtain an output value that results from executing kernel function 212(2). Kernel-space component 106 may then apply that output value as input for one of kernel function 212(3)-(5) in queue 230. Accordingly, kernel-space component 106 may enable kernel 110 to execute some kernel functions with arguments that result from other kernel functions included in the same executable block and/or queue.

As indicated above, framework 102 may also include macros that map to kernel functions in kernel space 220. In one example, message 120 may include at least one call to a macro that maps to multiple kernel functions. As a result, kernel-space component 106 may identify those kernel functions mapped to the macro called in message 120. In this example, kernel-space component 106 may then populate queue 230 with those kernel functions. Finally, kernel-space component 106 may execute those kernel functions along with other kernel functions identified in message 120 as part of a single block.

In some examples, kernel-space component 106 may obtain at least one output value that results from executing the entire series of kernel functions 212(1)-(5). Kernel-space component 106 may then return the output value to user space 218 to facilitate completion of unit testing of kernel 110. For example, user-space component 104 may receive the returned output value from kernel space 220 and then analyze the returned output value to confirm whether the series of kernel functions 212(1)-(5) worked as expected. By confirming whether the series of kernel functions 212(1)-(5) worked as expected, user-space component 104 may, in conjunction with kernel-space component 106, facilitate and/or carry out kernel debugging from user space 218 and/or form an interactive user-space kernel debugger. Additionally or alternatively, user-space component 104 may display information for a user to analyze and/or determine, based on such information, whether the series of kernel functions 212(1)-(5) worked as expected.

Figure 5:
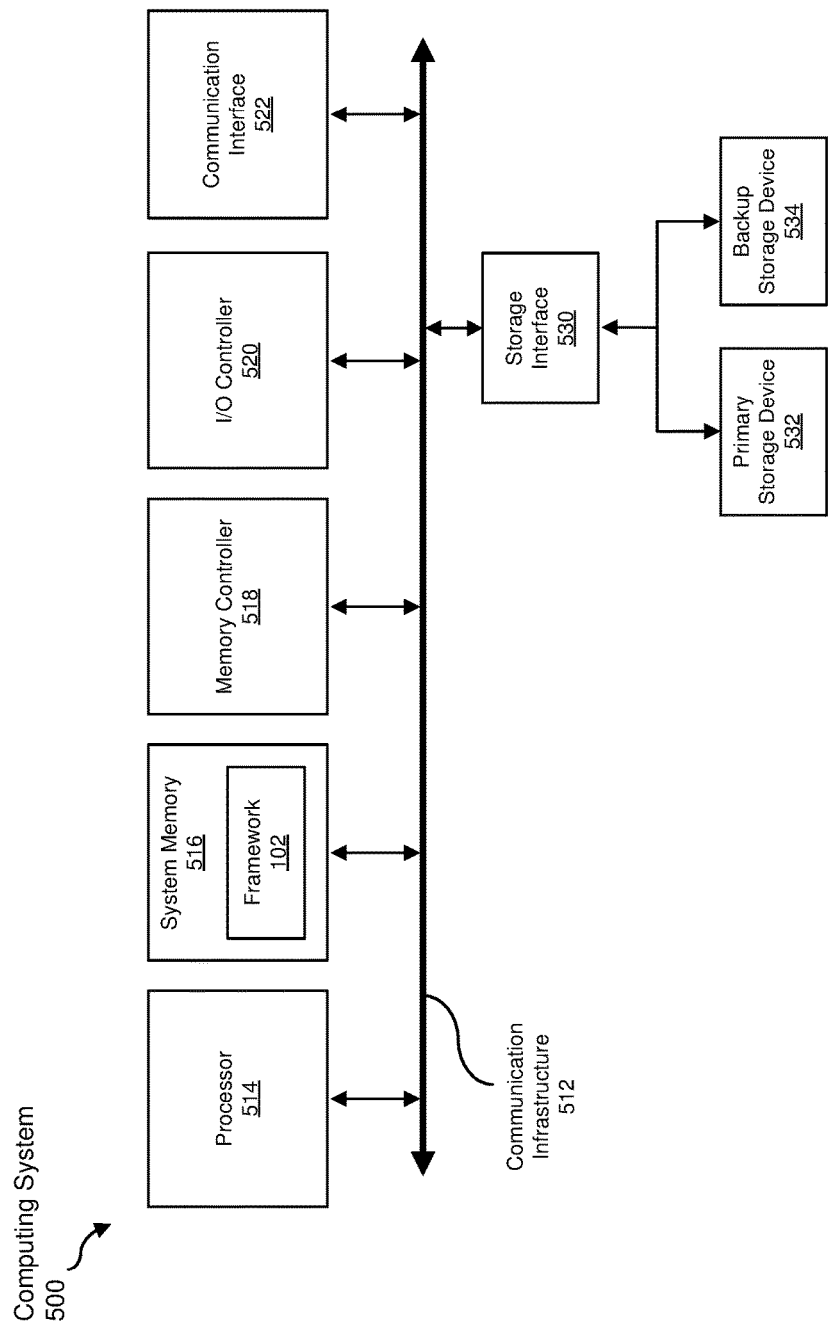
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 3. All or a portion of computing system 500 may also perform and/or be a means for performing and/or implementing any other steps, methods, or processes described and/or illustrated herein. In one example, computing system 500 may include and/or store all or a portion of framework 102 from FIG. 1.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
providing a framework that includes:
   a user-space component that runs in user space on a computing device; and
   a kernel-space component that runs in kernel space on the computing device;
identifying, via the user-space component, a series of kernel functions to be tested in kernel space on the computing device, wherein the kernel functions reside in kernel space and have addresses in kernel space that are unknown to the user-space component;
identifying attributes of the kernel functions to be tested in kernel space;
identifying, via the user-space component, one or more arguments for the series of kernel functions to be tested in kernel space on the computing device;
performing, via the user-space component, unit testing of a kernel of the computing device from user space by:
generating at least one message that:
identifies the series of kernel functions to be tested in kernel space and the arguments for the series of kernel functions; and
specifies the attributes of the kernel functions such that the kernel-space component is able to:
obtain references to the kernel functions by way of the attributes specified within the message; and
invoke the kernel functions in kernel space by way of the references to the kernel functions; and
sending the message to the kernel-space component to direct the kernel-space component to:
populate a queue in kernel space with the series of kernel functions and the arguments identified in the message; and
sequentially execute, in kernel space, the series of kernel functions in the queue with the arguments.

2. The method of claim 1, wherein the references to the kernel functions comprise the addresses of the kernel functions in kernel space.

3. The method of claim 1, wherein obtaining the references to the kernel functions comprises:
identifying one or more lookup functions that correspond to the kernel functions; and looking up the references to the kernel functions by applying the attributes specified within the message as input values for the lookup functions.

4. The method of claim 1, wherein the framework comprises at least one Application Programming Interface (API) that facilitates:
copying data between user space and kernel space;
selecting a macro that maps to one or more kernel functions;
storing an output value that results from sequentially executing a series of kernel functions in a queue;
returning the output value that results from sequentially executing the series of kernel functions to user space;
modifying data stored in kernel space from user space;
caching the series of kernel functions in the queue for execution in kernel space; and
debugging the kernel from user space.

5. The method of claim 1, wherein sequentially executing the series of kernel functions in the queue comprises:
launching a new thread in kernel space; and
sequentially executing the entire series of kernel functions as a single block by way of the new thread in kernel space.

6. The method of claim 5, wherein sequentially executing the series of kernel functions in the queue comprises sequentially executing, via the kernel-space component, the series of kernel functions in the queue as a single block without halting any operations scheduled for execution in a preexisting thread in kernel space.

7. The method of claim 1, wherein sequentially executing the series of kernel functions in the queue comprises storing, in a data structure in kernel space, at least one value in connection with the execution of at least one of the kernel functions; and
further comprising at least one of:
   placing a read lock on the data structure to secure the data structure during a read operation; and
   placing a write lock on the data structure to secure the data structure during a write operation.

8. The method of claim 1, wherein sequentially executing the series of kernel functions in the queue comprises:
obtaining at least one output value that results from executing one of the kernel functions in the queue; and
applying the output value as an input value for another one of the kernel functions in the queue.

9. The method of claim 1, wherein:
the framework comprises at least one macro that maps to at least one of the kernel functions in kernel space;
the message includes at least one call to the macro that maps to the one of the kernel functions;
further comprising populating the queue in kernel space with the series of kernel functions and the arguments comprises:

identifying, via the kernel-space component, the one of the kernel functions based at least in part on the macro and the call to the macro; and populating, via the kernel-space component, the queue in kernel space with the one of the kernel functions identified based at least in part on the macro and the call to the macro.

10. The method of claim 1, wherein sequentially executing the series of kernel functions in the queue comprises:

obtaining at least one output value that results from executing the series of kernel functions in the queue; and returning the output value that results from sequentially executing the series of kernel functions to user space to facilitate completion of the unit testing of the kernel.

11. A system comprising:
a framework, stored in memory, that includes:
a user-space component that runs in user space on a computing device; and
a kernel-space component that runs in kernel space on the computing device;
wherein the user-space component:
identifies a series of kernel functions to be tested in kernel space on the computing device,
wherein the kernel functions reside in kernel space and have addresses in kernel space that are unknown to the user-space component;
identifies attributes of the kernel functions to be tested in kernel space;
identifies, via the user-space component, one or more arguments for the series of kernel functions to be tested in kernel space on the computing device;
performs, via the user-space component, unit testing of a kernel of the computing device from user space by:
generating at least one message that:
identifies the series of kernel functions to be tested in kernel space and the arguments for the series of kernel functions; and
specifies the attributes of the kernel functions such that the kernel space component is able to:
obtain references to the kernel functions by way of the attributes specified within the message; and
invoke the kernel functions in kernel space by way of the references to the kernel functions; and
sending the message to the kernel-space component to direct the kernel-space component to:
populate a queue in kernel space with the series of kernel functions and the arguments identified in the message; and
sequentially execute, in kernel space, the series of kernel functions in the queue with the arguments; and at least one physical processor that executes the framework stored in memory.

12. The system of claim 11, wherein the references to the kernel functions comprise the addresses of the kernel functions in kernel space.

13. The system of claim 11, wherein the kernel-space component:
identifies one or more lookup functions that correspond to the kernel functions; and looks up the references to the kernel functions by applying the attributes specified within the message as input values for the lookup functions.

14. The system of claim 11, wherein the framework comprises at least one Application Programming Interface (API) that facilitates:
copying data between user space and kernel space;
selecting a macro that maps to one or more kernel functions;
storing an output value that results from sequentially executing a series of kernel functions in a queue;
returning the output value that results from sequentially executing the series of kernel functions to user space;
modifying data stored in kernel space from user space;
caching the series of kernel functions in the queue for execution in kernel space; and
debugging the kernel from user space.

15. The system of claim 11, wherein the kernel-space component:
launches a new thread in kernel space; and
sequentially executes the entire series of kernel functions as a single block by way of the new thread in kernel space.

16. The system of claim 15, wherein the kernel-space component sequentially executes the series of kernel functions in the queue as a single block without halting any operations scheduled for execution in a preexisting thread in kernel space.

17. The system of claim 11, wherein the kernel-space component:
stores, in a data structure in kernel space, at least one value in connection with the execution of at least one of the kernel functions;
and at least one of:
places a read lock on the data structure to secure the data structure during a read operation; and
places a write lock on the data structure to secure the data structure during a write operation.

18. A non-transitory computer-readable medium comprising one or more computer-executable instructions that, when executed by at least one processor of a computing device, cause the computing device to:
provide a framework that includes:
a user-space component that runs in user space on the computing device; and
a kernel-space component that runs in kernel space on the computing device;
identify, via the user-space component, a series of kernel functions to be tested in kernel space on the computing device, wherein the kernel functions reside in kernel space and have addresses in kernel space that are unknown to the user space component;
identifying attributes of the kernel functions to be tested in kernel space;
identify, via the user-space component, one or more arguments for the series of kernel functions to be tested in kernel space on the computing device;
perform, via the user-space component, unit testing of a kernel of the computing device from user space by:
generating at least one message that:
identifies the series of kernel functions to be tested in kernel space and the arguments for the series of kernel functions; and
specifies the attributes of the kernel functions such that the kernel-space component is able to:
obtain references to the kernel functions by way of the attributes specified within the message; and
invoke the kernel functions in kernel space by way of the references to the kernel functions; and
sending the message to the kernel-space component to direct the kernel-space component to:
populate a queue in kernel space with the series of kernel functions and the arguments identified in the message; and sequentially execute, in kernel space, the series of kernel functions in the queue with the arguments.

* * * * *